G. E. BISHOP.
AUTOMOBILE CURTAIN.
APPLICATION FILED JULY 30, 1914.

1,240,928.

Patented Sept. 25, 1917.

Witnesses
S. W. Brainard
A. L. Percy

Inventor
George E. Bishop
By G. W. Caywell
Attorney

UNITED STATES PATENT OFFICE.

GEORGE E. BISHOP, OF CLEVELAND, OHIO.

AUTOMOBILE-CURTAIN.

1,240,928.  Specification of Letters Patent.  Patented Sept. 25, 1917.

Application filed July 30, 1914.  Serial No. 854,057.

*To all whom it may concern:*

Be it known that I, GEORGE E. BISHOP, a citizen of the United States, resident of Cleveland, county of Cuyahoga, and State of Ohio, have invented new and useful Improvements in Automobile-Curtains, of which the following is a specification.

My invention relates to automobile curtains, and particularly to such curtains as are adaptable for for use as side curtains and are carried upon the automobile doors. More particularly, my invention relates to curtains which may be readily placed in position and removed, which swing with the automobile doors to allow easy ingress and egress, and which are easily rolled up so as to occupy the least space when not in use. More particularly further, my invention relates to a curtain which is in itself a self-contained frame requiring little or no foreign support to hold it in shape and position and cause it to give complete service.

Figure 1:
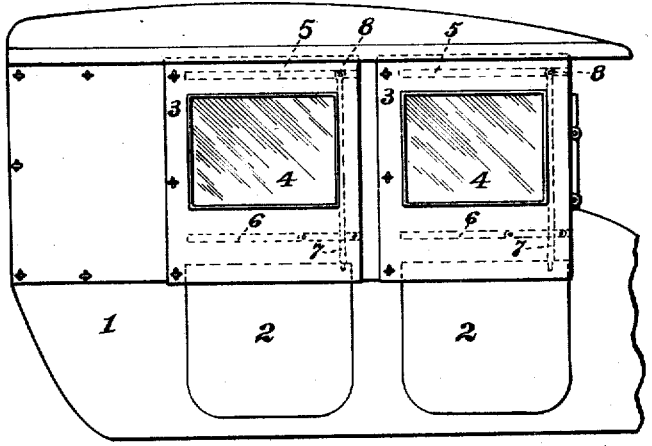
Figure 3:
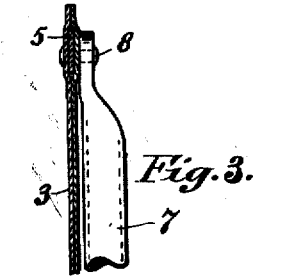
Figure 2:
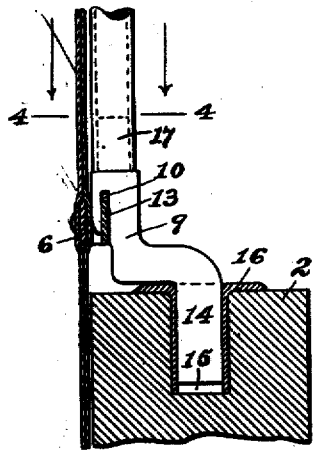
Figure 2:
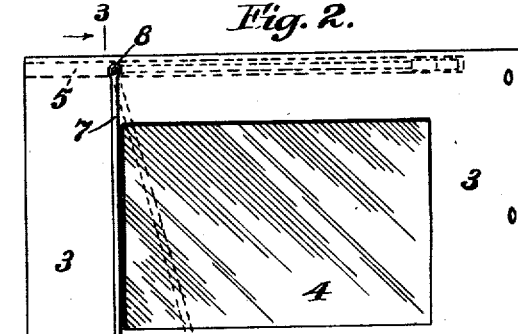
Figure 4:
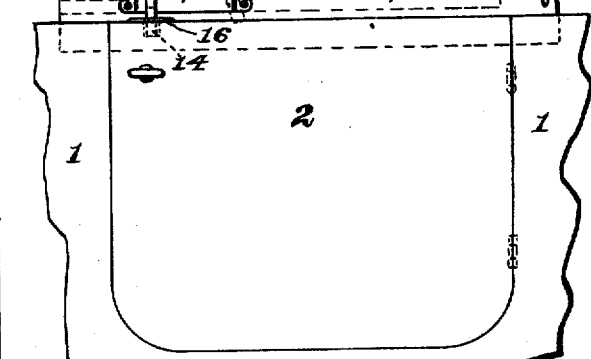

Referring to the accompanying drawing, Figure 1 represents a broken side elevation of an automobile showing two of my improved curtains thereon in service; Fig. 2 represents, looking from within an automobile, a broken elevation of a rearwardly swinging automobile door carrying one of my improved curtains, there being shown further therein in dotted lines two positions of a movable element forming part of my invention, one position showing said element when the curtain is not in service and the other may be readily rolled up and the other when said element is so adjusted as to have merely broken the integrity of the self-contained frame; Fig. 3 represents a broken vertical section taken upon the lines 3—3, Fig. 2; and Fig. 4 represents a broken horizontal section taken upon the lines 4—4, Fig. 3.

Referring to the drawing, 1 represents an automobile body provided with the doors 2—2, upon which are mounted curtains comprising my invention. Said curtain is constituted of a standard curtain fabric 3 in which is carried a transparency 4. Integrally incorporated with said curtain fabric 3 are rigid strengthening members comprising two metallic elements, shown of rectangular cross-section, an upper one 5 and a lower one 6, respectively, and a vertical element 7 constituted of a round hollow rod hinged to upper member 5 at 8 and receiving and connected with the tapered end 17 of a solid irregular shaped element 9 having an undercut guiding slot 10. Secured to the member 6 at 11 and 12 is a tongue 13 adapted to register with the slot 10 and of such a length as to insure the release of the member 9 and consequently the vertical rod 7 therefrom when said member 9 is moved to the angular dotted line position shown in Fig. 2. When the vertical rod 7 is thrown into the horizontal dotted line position shown in Fig. 2, the curtain may be rolled up to occupy the least space when not in service. The whole curtain, as a self-contained frame, is put into service by means of inserting the lower section 14 of the member 9 in a suitable socket 15 provided in the top of the door 2. A bearing member 16 is provided of such a construction as to fit within the socket 15 and receive said portion 14.

Whatever little connecting of the self-contained frame with the automobile body and top is required, other than the supporting thereof upon the automobile door, will vary to conform to the different designs of different automobile bodies and tops, one conventional connection being shown in Fig. 1.

I have shown my improved curtain as of a generally rectangular shape but the same will vary in shape for different uses and different automobile body and top designs.

It will be apparent from the above description that my improved automobile curtain of the construction shown constitutes a frame which is self-contained; that it allows easy ingress and egress: and that, by reason of the construction and action of the vertical element 7 with reference to the other elements, the integrity of the frame may be readily broken and the curtain, when not in use, may be readily rolled up and stored in small space.

Having thus shown and described my invention, what I claim and desire to secure by Letters Patent is:

1. In an automobile curtain, the combination with suitable curtain fabric; of a collapsible frame supporting the latter, said frame comprising a strengthening member incorporated with said fabric, a stretching member pivoted to said strengthening member, and a third member secured to said fabric, said stretching member being provided with a connecting element coöperating with said third member so as to effect the union and separation of said element and member by the pivotal movement of said stretching member, whereby the integrity and collapsing of said frame are effected.

2. In a collapsible frame for supporting automobile door curtains or similar structures, the combination of strengthening members; a spreading member pivoted to one of said strengthening members and detachably connected to another strengthening member; and coöperating connecting means formed upon said last-named strengthening member and said spreading member, respectively, to effect said connection and detachment by the pivotal movement of said spreading member.

3. In an automobile curtain, the combination of suitable curtain fabric; a frame supporting the latter, an element of said frame being movable relatively to the other elements thereof and formed with a groove or slot; and a member formed with a tongue registering with said groove, the relative disposition of said element and said member at one end of the path of movement of the former providing for the integrity of the curtain and intermediately of the two ends of the path of movement of the element providing for the release of said tongue from said groove whereby the curtain can be collapsed.

4. In an automobile curtain, the combination of suitable curtain fabric; strengthening members incorporated therewith, one of said members being formed with a tongue; and a standard or rod formed with a groove or slot adapted to register with the tongue of said member, said standard or rod being hinged to another member, the relative disposition of said rod and said tongue-member at certain points in the path of movement of the former providing for the integrity of the curtain and at other points providing for the release of said tongue from said groove whereby the curtain can be collapsed.

5. In a self-contained collapsible automobile curtain, the combination of suitable curtain fabric; two oppositely disposed strengthening members incorporated therewith; a member attached to one of said strengthening members and forming a tongue; and a standard or rod hinged to the other strengthening member and formed with a groove or slot adapted to register with the tongue-member, the pivotal movement of said rod providing for the release of said tongue from said groove.

In testimony whereof, I have signed this specification on this 8th day of July, 1914.

GEORGE E. BISHOP.

Witnesses:
 M. BEVIS,
 C. B. BAYLY.